Jan. 21, 1930.  G. HULTBERG  1,744,473
MACHINE FOR CUTTING OUT BLANKS
Filed Nov. 3, 1925   3 Sheets-Sheet 1

Gottfrid Hultberg
INVENTOR

BY Daniel J. Mayne
ATTORNEY

Jan. 21, 1930. G. HULTBERG 1,744,473
MACHINE FOR CUTTING OUT BLANKS
Filed Nov. 3, 1925  3 Sheets-Sheet 2

Gottfrid Hultberg
INVENTOR

BY
ATTORNEY

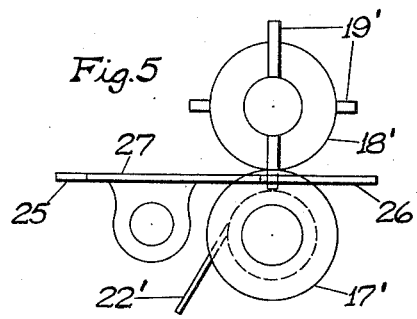
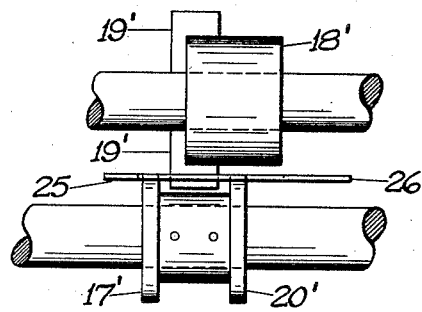
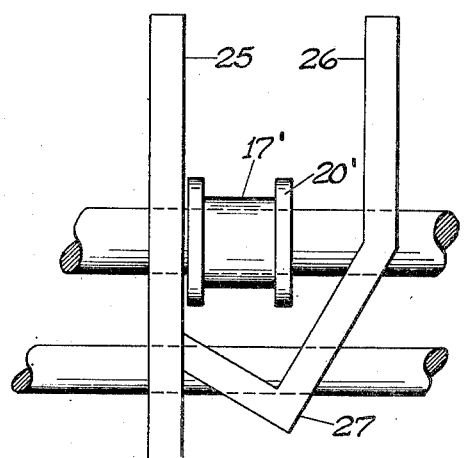

Patented Jan. 21, 1930

1,744,473

UNITED STATES PATENT OFFICE

GOTTFRID HULTBERG, OF CHICAGO, ILLINOIS, ASSIGNOR TO THE BARRETT COMPANY, A CORPORATION OF NEW JERSEY

MACHINE FOR CUTTING OUT BLANKS

Application filed November 3, 1925. Serial No. 66,433.

This invention relates to machines for cutting out blanks and more particularly to shingle cutting machines.

The ordinary method of cutting out blanks, such as shingles, is to pass a continuous sheet of prepared roofing material between rolls, one of which is a cutting roll upon which are mounted knives having such a shape or layout as to cut the shingle into the desired form. The operation is continuous, the sheet of prepared material coming from between the rolls as shingles. The shingles are then taken up by conveyers (traveling belts) which transmit the shingles to a packing machine where the shingles are packed for storage or sale. Certain difficulties, however, arise in this seemingly simple operation, to overcome which it is one of the objects of this invention.

For instance, because of the nature of prepared roofing material (being impregnated with tar or asphalt of high viscosity at ordinary temperatures) and because of the fact that it is not at all times possible to keep knives set so as to complete the severing of the roofing material along the predetermined lines desired, it has been found that the waste portions, (some of which are commonly called tabs) which it is intended shall separate from the shingle, at times adhere to the shingle and unless properly removed will accompany the shingle to its final packing and there, because of the pressure placed upon the package to make it compact, the waste portions will damage the finished shingle by pressing those portions, with which it is in contact, out of shape.

It is, therefore, among the objects of my invention to provide means for positively removing the waste portions from the blank (such as a shingle) after it has been cut out in its desired shape.

The nature of this invention will be more thoroughly understood from the following description and accompanying drawings made a part hereof, which disclose a machine and method for cutting out a shingle as illustrative of one use to which my invention may be put.

In the drawings in which like reference characters refer to like parts,

Fig. 5 is a diagrammatic side elevation of a modified form of tab remover;

Fig. 6 is a front elevation of the apparatus shown in Fig. 5;

Fig. 7 is a plan view of the lower portion of Fig. 5.

Figure 1:
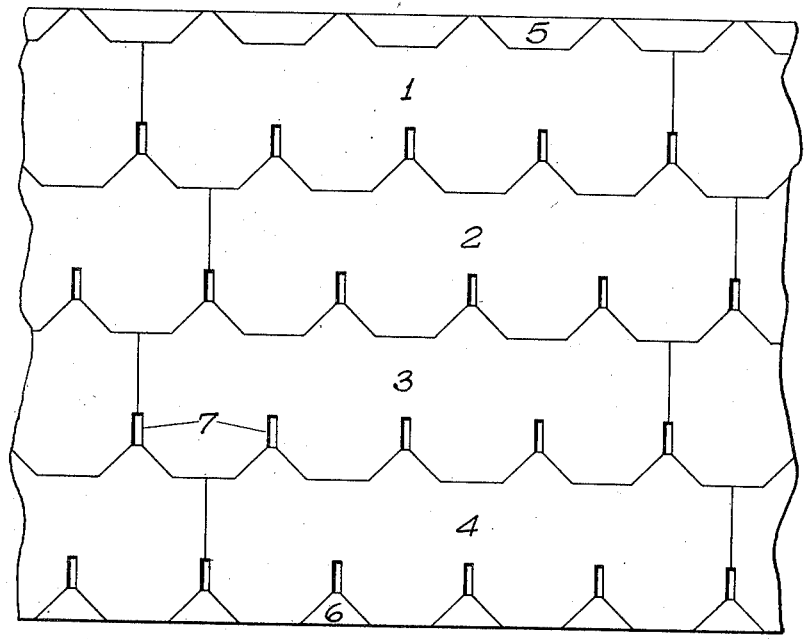
Fig. 1 is a plan view of a portion of a sheet of roofing material that has passed thru the cutting roll.

In Fig. 1 reference characters 1, 2, 3, and 4 represent the shingles that are cut from the sheet of roofing material. It is seldom, if ever, that the waste portions 5 and 6 continue to adhere to the shingle after the sheet has been cut. Because of their weight they will usually fall to the floor immediately upon leaving the cutting roll or are scraped off by the front edge of the plate (13) and are then removed from the floor as found necessary. The waste portions (7), commonly called "tabs," are those with which difficulty is experienced. Because they are small they will frequently not drop from the shingle of their own weight and because they are cut from the interior of the sheet of material, will often adhere to the shingle unless removed by some positive means.

In practicing my invention the sheet (8) of prepared roofing material passes over the idler roll (9), over the platen roll (10) and thence between the later and the cutter roll (11), whereby the shingles 1, 2, 3, and 4 are cut from the sheet, the rolls being rotated in the direction of the arrows. The waste portions (5) and (6) drop from the sheet immediately after being cut while the four rows of shingles, together with the tabs (7) pass onto the plate (13). There the tabs are removed and the shingles pass on to the conveyer belts (14) and (15) which carry them to packing and storage.

Figure 4:
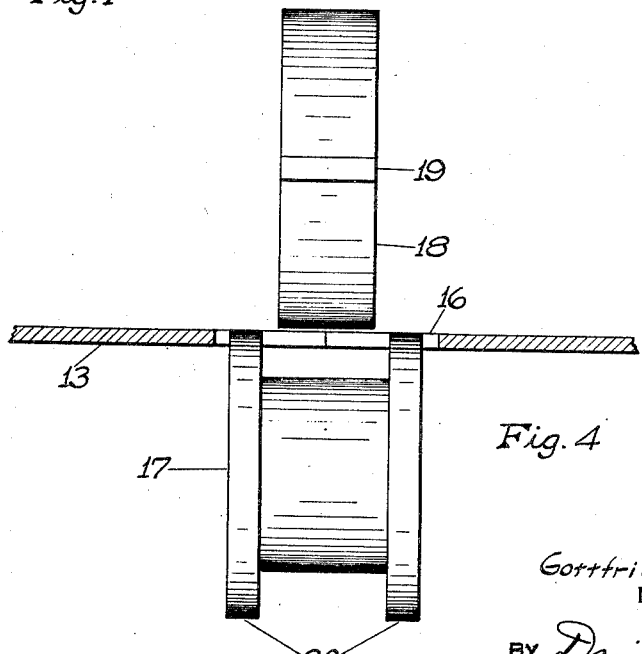
Fig. 4 is a front elevation of one of the tab removers.
Figure 2:
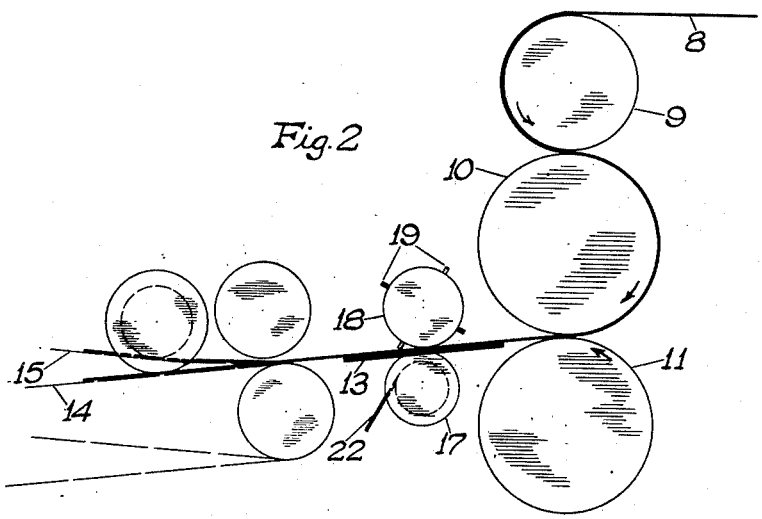
Fig. 2 is a diagrammatic side elevation of the feed and cutting rolls, the tab remover and a portion of the conveying apparatus.
Figure 3:
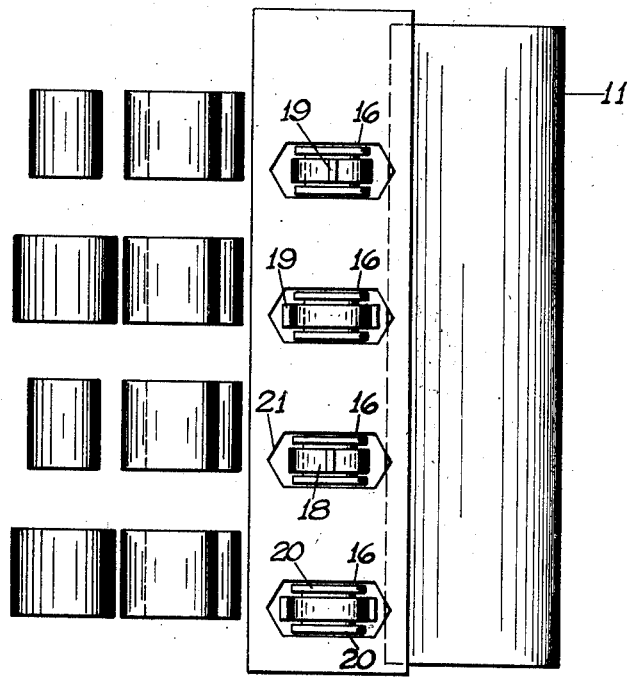
Fig. 3 is a plan view of the apparatus shown in Fig. 2.

In order to remove those tabs from the shingles which have not previously dropped of their own gravity, I provide openings (16) in the plate (13) and spool rolls (17) and knocker rolls (18). The rolls (17) and (18) are geared to the rolls (10) and (11), are all positively driven and are so synchronized that the blunt ends of the tab knockers (19) strike those tabs (7) which are still adhering to the shingles as the latter pass between rolls (17) and (18). It will be noted from Fig. 4 that the roll (17) has flanged portions (20) thereon, which are flush with the top of plate (13). By this arrangement the feeding of the shingles from the cutter roll, past the knocker roll and onto the conveyers is facilitated. As the roll (18) rotates, the knockers (19) pass thru the opening (16) and between the flanged portions of the roll (17), thus positively removing the tabs from the shingles. In the event that any tab still clings to the shingle it is removed by the V-shaped portion (21) of the slot (16). Doctor blades (22) ride between the flanged portions of the rolls (17) and remove any tabs which adhere to this roll.

Altho the above is the preferred embodiment of my invention, Figs. 5, 6 and 7 show a modification which may be employed. In place of the slotted plate (13) I may employ parallel bars (25) and (26) joined by a V-shaped bar (27) and in the claims the term "slotted plate" or equivalent terminology is intended to include this modification. I may also desire to place the tab knockers (19') at one side of the center of the rolls (18'), as shown in Fig. 6.

The rolls herein mentioned are set in suitable bearings and the plate (13) or the bars (25) and (26) are supported in any manner desirable so long as they are firmly held in the position indicated.

The knockers (19) upon alternating rolls are respectively rotated 90° so as to properly engage the tabs (7) upon adjacent shingles, as will be readily observed to be necessary from the layout in Fig. 1. In the event that a different type of shingle having differently located tabs is being manufactured, more or less tab knockers 19 may be employed and/or differently positioned upon the roll 18 as will be obvious to those skilled in the art.

Shingle cutting machines in general are of such well known design that the applicant has considered it unnecessary to show a complete machine, only that portion necessary to the understanding of his invention being illustrated.

Inasmuch as a shingle cutting machine is sometimes a plant in itself and since the operation thereof is continuous, it is obvious that applicant's invention fulfills a great need in this industry because it is a positive and automatic means for finally removing from the cut shingle any waste portions which adhere thereto. As already referred to, this is exceptionally important in this industry because the presence of a very small number of tabs in a shingle bundle will distort the individual shingle to such an extent that it may be necessary to discard the entire bundle.

Obviously, the above description is only illustrative of applicant's invention, since same may be used to remove the waste tabs from any kind of blanks that are being cut out by a similar method, such for instance as blanks from which boxes are to be made.

What I claim as my invention and desire to be secured by Letters Patent of the United States is:

1. In a machine for cutting out blanks the combination with a roll having flanges, of an adjacent knocker roll provided with a plurality of tab ejecting projections having blunt ends which are adapted, during the rotation of the roll, to pass between the flanges of the other roll.

2. In a machine for cutting out blanks the combination with a slotted plate, of a flanged roll on one side of the plate and a knocker roll on the other side of the plate provided with a plurality of projections having blunt ends.

3. In a machine for cutting out blanks the combination with a slotted plate, of a flanged roll extending into said slot and a knocker roll provided with a plurality of projections having blunt ends which are adapted, during the rotation of the roll, to pass through the said slot and between the flanges of the other roll.

4. In a machine for cutting out blanks a plate having a substantially rectangular slot, the ends of said slot being V-shaped, a flanged roll on one side of the plate and a roll on the other side of the plate provided with a plurality of projections the said rolls registering with the rectangular portion of the said slot.

5. In a machine for cutting out blanks, a plate having a substantially rectangular slot, the ends of said slot being V-shaped, a flanged roll extending into said slot and a roll provided with a plurality of projections which are adapted, during the rotation of the roll, to pass through the said slot and between the flanges of the other roll.

6. In a machine for cutting out blanks from a continuously moving sheet the combination with cooperating cutting and platen rolls, of a flanged roll and an adjacent knocker roll provided with a plurality of tab ejecting projections having blunt ends which are adapted, during the rotation of the roll, to pass between the flanges of the other roll, all of the said rolls being synchronized.

7. In a machine for cutting out blanks from a continuously moving sheet the combination with cooperating cutting and platen rolls, of a slotted plate, a roll having flanges extending into said slot and a knocker roll provided with a plurality of projecting members having blunt ends which are adapted, during the rotation of the roll, to pass through the said slot and between the flanges of the other roll.

8. In a machine for cutting out blanks the combination with a plate having a plurality of slots, of an equal number of rolls on one side of the plate having flanges and an equal number of knocker rolls on the other side of the plate, each of the latter rolls being provided with a plurality of projections which are adapted, during the rotation of the roll, to pass through their respective slots and between the flanges of the respective rolls associated therewith.

9. In a machine for cutting out blanks, a plate having a substantially rectangular slot, the end of the slot over which the material being cut last passes being substantially V-shaped, a flanged roll on one side of the plate and a roll on the other side of the plate provided with a plurality of projections.

10. In a machine for cutting out blanks the combination with a roll having flanges, of an adjacent knocker roll provided with a plurality of tab ejecting projections having blunt ends which are adapted, during the rotation of the roll, to pass between the flanges of the other roll and a tab stripping blade positioned between the flanges of said roll.

11. In a machine for cutting out blanks from a continously moving sheet, in combination, a slotted plate, cutter rolls and a pair of cooperating rotatable non-cutting rolls positioned one above and the other below the slot in said plate and arranged to permit passage of the sheet therebetween, projections on one of said cooperating non-cutting rolls arranged to positively engage the cut sheet to remove cut portions therefrom, the other of said cooperating non-cutting rolls being provided with a recess, said projections registering with said recess during the rotation of said non-cutting rolls.

In testimony whereof I affix my signature.
GOTTFRID HULTBERG.